(12) United States Patent
Katagiri et al.

(10) Patent No.: US 8,251,734 B2
(45) Date of Patent: Aug. 28, 2012

(54) LOCKING DEVICE FOR POWER FEEDING PLUG

(75) Inventors: Toshiharu Katagiri, Aichi (JP); Keiji Kahara, Aichi (JP); Takahiro Hirashita, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 13/152,803

(22) Filed: Jun. 3, 2011

(65) Prior Publication Data

US 2011/0300736 A1    Dec. 8, 2011

(30) Foreign Application Priority Data

Jun. 8, 2010 (JP) ................... 2010-131056

(51) Int. Cl.
*H01R 13/627* (2006.01)
(52) U.S. Cl. ........................ 439/352; 439/372
(58) Field of Classification Search .................. 439/352, 439/372, 358, 347
See application file for complete search history.

(56) References Cited

U.S. PATENT DOCUMENTS

| | | | | |
|---|---|---|---|---|
| 2,408,502 A * | 10/1946 | Writzmann | ................ | 200/332.2 |
| 2,984,724 A * | 5/1961 | Merz | ........................ | 200/332.2 |
| 5,350,312 A * | 9/1994 | Kuno et al. | ................... | 439/310 |
| 5,417,579 A * | 5/1995 | Yoshioka et al. | ............. | 439/310 |
| 5,458,496 A * | 10/1995 | Itou et al. | ........................ | 439/34 |
| 5,511,987 A * | 4/1996 | Shinchi | ......................... | 439/205 |
| 5,545,049 A * | 8/1996 | Hasegawa et al. | ............ | 439/310 |
| 5,556,284 A * | 9/1996 | Itou et al. | ........................ | 439/34 |
| 5,558,533 A * | 9/1996 | Hashizawa et al. | ............ | 439/310 |
| 5,577,920 A * | 11/1996 | Itou et al. | ......................... | 439/34 |
| 5,627,448 A * | 5/1997 | Okada et al. | ..................... | 439/133 |
| 5,676,560 A * | 10/1997 | Endo et al. | ...................... | 439/310 |
| 5,906,500 A * | 5/1999 | Kakuta et al. | .................. | 439/310 |
| 6,203,355 B1 * | 3/2001 | Neblett et al. | ................. | 439/372 |
| 6,702,475 B1 * | 3/2004 | Giobbio et al. | ................ | 385/53 |
| 6,962,502 B2 * | 11/2005 | Kind et al. | ...................... | 439/353 |
| 7,878,866 B1 * | 2/2011 | Kwasny et al. | ............... | 439/695 |
| 7,963,793 B2 * | 6/2011 | Poulin et al. | ................... | 439/352 |
| 7,972,167 B2 * | 7/2011 | Amit et al. | ..................... | 439/456 |
| 8,016,607 B2 * | 9/2011 | Brown, II | ....................... | 439/353 |
| 8,075,329 B1 * | 12/2011 | Janarthanam et al. | ......... | 439/304 |
| 2011/0201223 A1 * | 8/2011 | Kurumizawa et al. | ........ | 439/345 |
| 2011/0300728 A1 * | 12/2011 | Katagiri et al. | ............... | 439/147 |
| 2012/0047971 A1 * | 3/2012 | Katagiri et al. | .................... | 70/58 |

FOREIGN PATENT DOCUMENTS

JP    9-161898    6/1997

* cited by examiner

*Primary Examiner* — Amy Cohen Johnson
*Assistant Examiner* — Vladimir Imas
(74) *Attorney, Agent, or Firm* — Patterson Thuente Christensen Pedersen, P.A.

(57) ABSTRACT

A locking device that locks a power feeding plug to a power receiving connector, one of the power feeding plug and the power receiving connector including a hook, the other one of the power feeding plug and the power receiving connector including a catch, the locking device including a lock bar that is moved between a first lock position, at which it holds the hook on the catch and a first unlock position, at which it permits the hook to move away from the catch. A wire is moved between a second lock position, at which it is engaged with the lock bar and restricts movement of the lock bar to the first unlock position, and a second unlock position, at which it is disengaged from the lock bar and permits movement of the lock bar to the first unlock position. A motor is arranged at a position separated from the power receiving connector. A cam transmits the driving force of the motor to the wire.

8 Claims, 9 Drawing Sheets

[State A]

Fig.8

[State A]

Fig.9

[State B]

Fig.10

[State B]

LOCKING DEVICE FOR POWER FEEDING PLUG

CROSS-REFERENCE TO RELATED APPLICATIONS

This application is based upon and claims the benefit of priority from prior Japanese Patent Application No. 2010-131056, filed on Jun. 8, 2010, the entire contents of which are incorporated herein by reference.

BACKGROUND OF THE INVENTION

The present invention relates to a locking device for a power feeding plug.

Automobile manufactures are not concentrating on the development of electric vehicles (include hybrid vehicles), which use motors as drive sources and lower exhaust gas emissions. Such an electric vehicle includes a battery, which supplies power to the motor. The battery must be charged in a household or at a charging station whenever the state of charge of the battery becomes low. Thus, an electric vehicle is provided with a charging system that is easy for a user to use. Japanese Laid-Open Patent Publication No. 9-161898 describes a conventional example of a charging system. In this charging system, a vehicle includes an inlet (power receiving connector), which is connectable to a power feeding plug that extends from, for example, a household outlet of a commercial power supply. The user charges the battery of the vehicle by connecting the power feeding plug to the inlet of the parked vehicle after coming home. The power feeding plug includes a hook, and the inlet includes a catch. Engagement of the hook and catch keep the power feeding plug and inlet connected to each other. An operation portion, which is arranged on the power feeding plug, is operated to move and release the hook from the catch. This allows for the power feeding plug to be removed from the inlet.

Although a fast charging technique is being developed, the time required to charge the battery of electric vehicles is still relatively long compared to filling a gasoline vehicle with fuel. Moreover, a fast charger is normally not installed in a typical household. Thus, when the user charges the battery at home, the vehicle is sometimes left unattended over a long period of time with the power feeding plug connected to the inlet of the vehicle. In such a case, someone may remove the power feeding plug from the vehicle when power is being fed from the household power supply and connect the power feeding plug to an inlet of another vehicle to steal electricity. There is also the possibility of the power feeding plug being stolen for the metal used in the power feeding plug.

Accordingly, a locking device that locks the power feeding plug to the inlet is arranged in the inlet to prevent unauthorized removal of the power feeding plug from the inlet. The locking device conventionally includes a lock bar, which is driven by a motor and moved between a lock position and an unlock position. When engagement of the hook of the power feeding plug with the catch of the inlet is detected, the lock bar moves from the unlock position to the lock position to lock the hook. This restricts movement of the hook. Since the hook and catch cannot be disengaged from each other, the power feeding plug cannot be removed from the inlet. Then, when an unlocking condition is satisfied, the lock bar is moved from the lock position to the unlock position to unlock the hook. This permits movement of the hook. Operation of the operation portion disengages the hook from the catch and allows the power feeding plug to be removed from the inlet.

In the conventional locking device, the motor that moves the lock bar between the lock position and the unlock position is arranged in the inlet (power receiving connector). Thus, space for the motor is necessary in the inlet or the neighborhood thereof. However, the inlet and its neighborhood have limited space. Accordingly, there is a demand for a locking device that locks the power feeding plug to the inlet without a motor installed in the inlet.

SUMMARY OF THE INVENTION

The present invention provides a locking device for a power feeding plug that locks the power feeding plug to a power receiving connector while miniaturizing the power receiving connector.

One aspect of the present invention is a locking device that locks a power feeding plug to a power receiving connector. One of the power feeding plug and the power receiving connector includes a hook. The other one of the power feeding plug and the power receiving connector includes a catch. The locking device includes a first restriction member that is moved between a first lock position, at which the first restriction member holds the hook on the catch, and a first unlock position, at which the first restriction member permits the hook to move away from the catch. When the hook moves away from the catch, the first restriction member is moved to the first unlock position in cooperation with the hook. A second restriction member is moved between a second lock position, at which the second restriction member is engaged with the first restriction member and restricts movement of the first restriction member from the first lock position to the first unlock position, and a second unlock position, at which the second restriction member is disengaged from the first restriction member and permits movement of the first restriction member to the first unlock position. A drive source is arranged at a position separated from the power receiving connector. The drive source generates driving force that moves the second restriction member. A transmission member transmits the driving force of the drive source to the second restriction member.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE EMBODIMENTS

A locking device for a power feeding plug according to one embodiment of the present invention will now be described with reference to the drawings. As an example, the locking device of the present embodiment is applied to a plug-in type hybrid vehicle.

Figure 1:
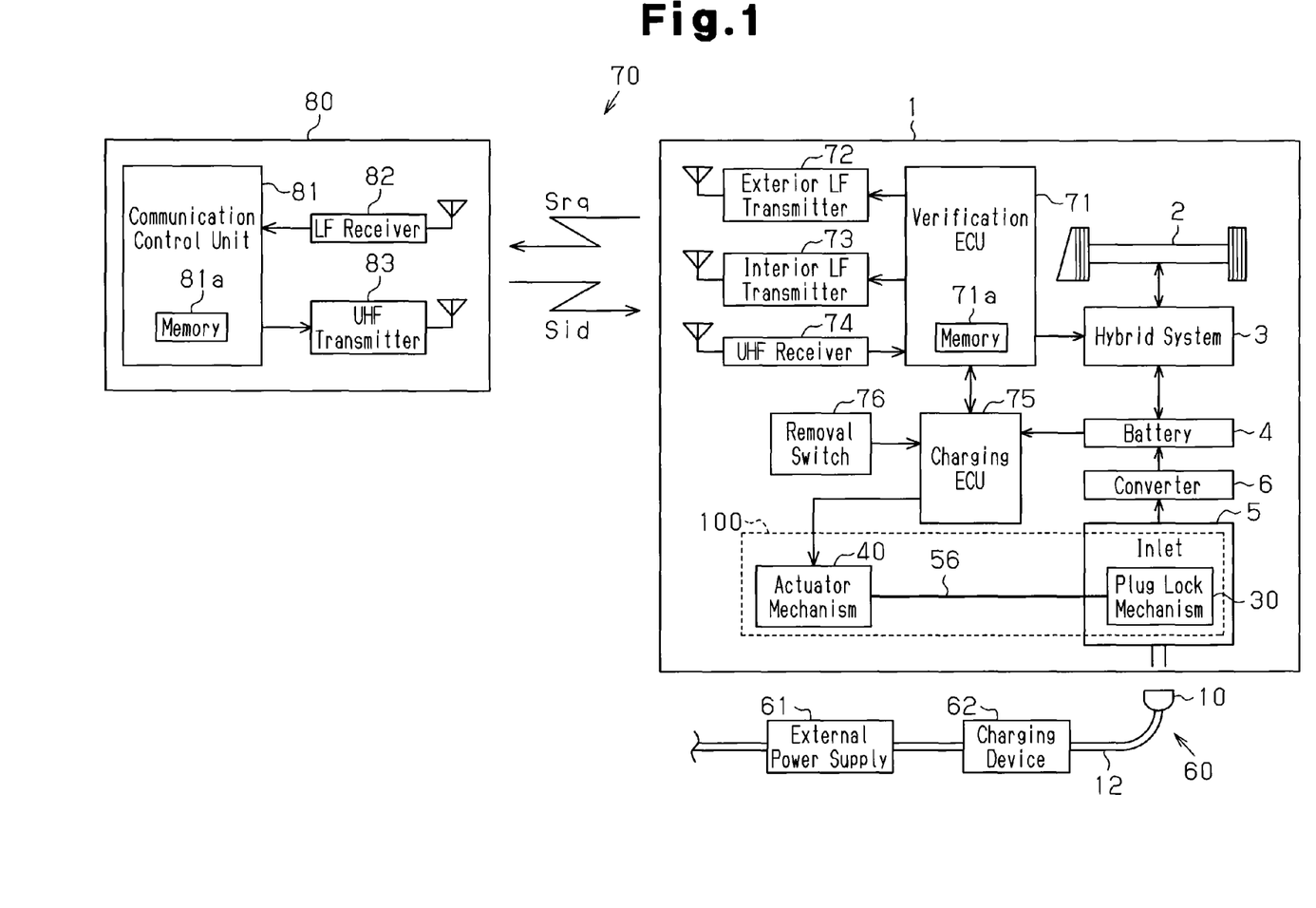
FIG. 1 is a schematic bock diagram of a charging system and an electronic key system in one embodiment.

Referring to FIG. 1, a hybrid vehicle 1 includes a hybrid system 3 that uses an engine and a motor, which serve as driving sources for driving wheels 2. The hybrid system 3 is connected to a battery 4.

The hybrid system 3 operates in various traveling modes, such as a mode for mechanically transmitting power from only the engine to the driving wheels 2, a mode for directly driving the driving wheels 2 with both the engine and the motor, and a mode for driving the driving wheels 2 with only the motor and without the engine. The hybrid system 3 changes the traveling modes in accordance with the traveling state of the vehicle. Further, the hybrid system 3 controls various types of charging modes, such as a mode for generating electric power with the engine to charge the battery 4 and a mode for generating electric power with the motor by converting the energy generated when braking the driving wheels 2 to charge the battery 4. The hybrid system 3 changes the charging modes in accordance with the traveling state of the vehicle. The vehicle 1 travels in the traveling mode controlled by the hybrid system 3.

An inlet 5, which serves as a power receiving connector, is connected to the battery 4 by a converter 6.

The inlet 5 is a connector component into which a power feeding plug 10 is inserted. The power feeding plug 10 is connected by a charging device 62 to an external power supply (AC power supply) 61 of the vehicle 1. The inlet 5 is arranged in a front side wall of the vehicle 1 in the same manner as a fuel inlet of a gasoline vehicle. The charging device 62 transmits a connection signal to the vehicle 1 when the power feeding plug 10 is inserted into the inlet 5. The converter 6 converts AC voltage, which is supplied from the power feeding plug 10 through the inlet 5, to DC voltage. Then, the converter sends the converted DC voltage to the battery 4. In this manner, the external power supply 61 is used to charge the battery 4.

The vehicle 1 forms an electronic key system 70 with an electronic key 80, which serves as a vehicle key. For instance, the electronic key system 70 controls locking and unlocking of the door without having the user actually operate the electronic key 80. In the electronic key system 70, vehicle control is executed through wireless communication between the vehicle 1 and the electronic key 80, which is carried by the user.

The electronic key system 70 will now be described in detail. A verification ECU 71 is mounted on the vehicle 1. The verification ECU 71 is connected to an exterior low frequency (LF) transmitter 72, an interior LF transmitter 73, and an ultrahigh frequency (UHF) receiver 74. The exterior LF transmitter 72 is arranged in each door of the vehicle 1 and transmits a signal carried on the LF band outside the vehicle. The interior LF transmitter 73 is arranged in the floor inside the vehicle and transmits a wireless signal carried on LF band inside the vehicle. The UHF receiver 74 is arranged at the rear of the vehicle body inside the vehicle and receives a wireless signal carried on the UHF band. The verification ECU 71 includes a memory 71a in which an ID code unique to the electronic key 80 is stored.

A communication control unit 81 is arranged in the electronic key 80. The communication control unit 81 is connected to an LF receiver 82, which receives a signal on the LF band, and an UHF transmitter 83, which transmits a signal on the UHF band in accordance with a command from the communication control unit 81. The communication control unit 81 includes a memory 81a in which an ID code unique to the electronic key 80 is stored.

The verification ECU 71 forms a communication area around the vehicle 1 by intermittently transmitting a request signal Srq from the exterior LF transmitter 72. When the user carries the electronic key 80 into the communication area, the LF receiver 82 receives the request signal Srq. In response to the request signal Srq, the communication control unit 81 returns an ID code signal Sid, which contains the ID code registered in the memory 81a, from the UHF transmitter 83. When the UHF receiver 74 receives the ID code signal Sid, the verification ECU 71 compares the received ID code and the ID code registered in the memory 71a to perform ID verification (exterior verification) on the electronic key 80. When the exterior verification is accomplished, the verification ECU 71 permits or performs unlocking of the doors with a door locking device (not shown).

After the exterior verification is accomplished and the door is unlocked, the verification ECU 71 transmits the request signal Srq from the interior LF transmitter 73 to form an interior communication area that extends over the entire interior of the vehicle. When the user carries the electronic key 80 into the interior communication area, the LF receiver 82 receives the request signal Srq. Then, the communication control unit 81 returns an ID code signal Sid containing the ID code registered in the memory 81a from the UHF transmitter 83. When the UHF receiver 74 receives the ID code signal Sid, the verification ECU 71 compares the received ID code and the ID code registered in the memory 71a to perform ID verification (interior verification) on the electronic key 80. When the interior verification is accomplished, the verification ECU 71 permits activation of the hybrid system 3.

In the present embodiment, the ID code verification of the electronic key system 70 is also performed when charging the battery 4 of the vehicle 1 with the external power supply 61. The vehicle 1 includes a charging ECU 75 that executes charging control. The charging ECU 75 communicates with the verification ECU 71 through an in-vehicle local area network (LAN) (not shown) to check the result of the ID verification performed by the verification ECU 71. The charging ECU 75 is also electrically connected to a removal switch 76 arranged in the vehicle 1. Further, the charging ECU 75 is electrically connected to a locking device 100.

The locking device 100 performs an unlock operation, which permits the connection and disconnection of the inlet 5 and power feeding plug 10, and a lock operation, which restricts the connection and disconnection of the inlet 5 and power feeding plug 10. The charging ECU 75 switches the locking device 100 between the lock operation and the unlock operation in accordance with the result of the exterior verification. Prior to accomplishment of the exterior verification, the locking device 100 restricts connection between the inlet 5 and the power feeding plug 10. When the charging ECU 75 confirms the accomplishment of the exterior verification performed by the verification ECU 71, the locking device 100 performs the unlock operation and permits charging of the battery 4. In other words, when the inlet 5 and the power feeding plug 10 are connected in this state, the charging ECU 75 receives the connection signal from the charging device 62 and starts charging the battery 4 with the external power supply 61 through the control of the converter 6. Accordingly, a person who does not have the electronic key 80 cannot perform the unlock operation with the locking device 100. The exterior communication area is formed around the entire vehicle 1. Thus, as long as the user, who is carrying the electronic key 80, stands by the inlet 5, which is arranged in the front side wall of the vehicle 1, the exterior verification is executed without any problems. The locking device 100 will be described in detail later.

Figure 2:
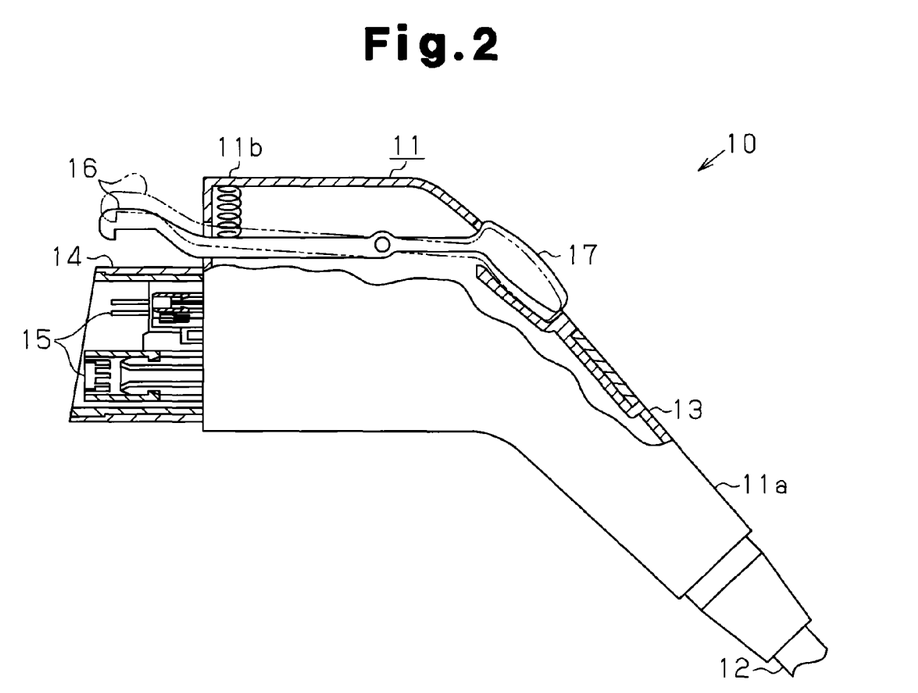
FIG. 2 is a partial cross-sectional view showing a power feeding plug arranged in the charging system of FIG. 1.

As shown in FIG. 2, the power feeding plug 10 includes a plug body 11. The plug body 11 includes a basal end 11a connected to a cable 12, which is electrically connected to the external power supply 61 (see FIG. 1). A grip 13, which the user grasps, is formed near the middle of the plug body 11. Further, the plug body 11 includes a distal end 11b. A cylindrical coupler 14, which is fitted to the inlet 5, is arranged in the distal end 11b. Connection terminals 15 are arranged in the coupler 14. The connection terminals 15 include a power terminal, which transmits power, and a control terminal, which communicate control commands.

A hook 16 is arranged on an upper part of the coupler 14 to keep the power feeding plug 10 and inlet 5 connected to each other. The hook 16 is pivotal about a pin arranged in the plug body 11. The hook 16 is moved between a first position, which is indicated by the solid lines in FIG. 2, and a second position, which is indicated by the broken lines. When the power feeding plug 10 is inserted into the inlet 5 and the hook 16 is pivoted to the first position to engage part of the inlet 5, the power feeding plug 10 and the inlet 5 are kept connected. When the hook 16 is pivoted to the second position and disengaged from part of the inlet 5, the power feeding plug 10 is removable from the inlet 5. The hook 16 is normally resiliently held at the first position. The hook 16 is moved to the second position (tilted state) when an operation portion 17, which is arranged in the upper part of the plug body 11, is pushed. The hook 16 resiliently returns to the first position when the operation portion 17 is released.

Figure 3A:
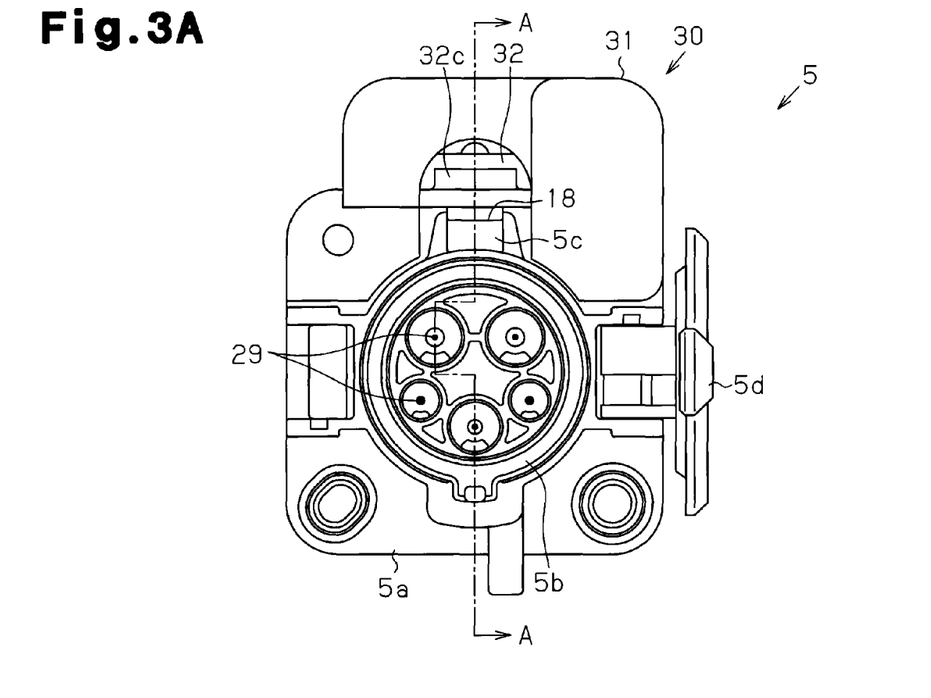
FIG. 3A is a schematic front view showing an inlet and a plug lock mechanism arranged in the charging system of FIG. 1.
Figure 3B:
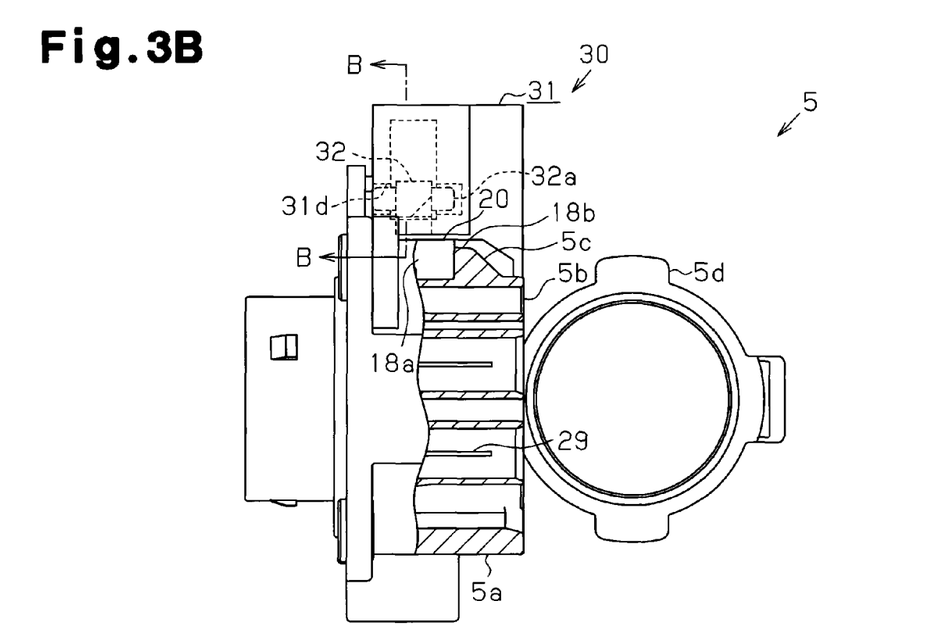
FIG. 3B is a cross-sectional view taken along line A-A in FIG. 3A.

As shown in FIGS. 3A and 3B, the inlet 5 includes an inlet body 5a. The inlet body 5a includes a cylindrical receptacle 5b, into which the coupler 14 of the power feeding plug 10 is inserted. Connection terminals 29 are arranged in the cylindrical receptacle 5b. The connection terminals 29 include a power terminal, which transmits power, and a control terminal, which communicates control commands. When the coupler 14 is inserted into the cylindrical receptacle 5b, the power terminal of the coupler 14 is connected to the power terminal of the cylindrical receptacle 5b and the control terminal of the coupler 14 is connected to the control terminal of the cylindrical receptacle 5b. The inlet 5 also includes a lid 5d, which covers the cylindrical receptacle 5b to protect the connection terminal 29 from the ambient environment. The lid 5d is pivotally supported beside the cylindrical receptacle 5b.

A catch 18, which is engageable with the hook 16, is formed on the upper part of the inlet body 5a. The catch 18 is includes an inclined surface 5c, which forms a plug insertion port. The inclined surface 5c is gradually inclined upward in the insertion direction of the power feeding plug 10. Accordingly, the inclined surface 5c moves the hook 16 from the first position to the second position when the power feeding plug 10 is inserted into the inlet 5. The catch 18 includes an engagement recess 18a, which allows for insertion and tilting of the hook 16. The hook 16 engages a wall 18b (see FIG. 6) of the recess 18a. Engagement of the hook 16 with the wall 18b restricts movement of the power feeding plug 10 relative to the inlet 5 in the removal direction.

The locking device 100 will now be described. As shown in FIG. 1, the locking device 100 includes a plug lock mechanism 30 and an actuator mechanism 40. The plug lock mechanism 30 restricts and allows tilting (pivoting) of the hook 16. The actuator mechanism 40 switches the plug lock mechanism 30 between a lock operation and an unlock operation.

Figure 4:
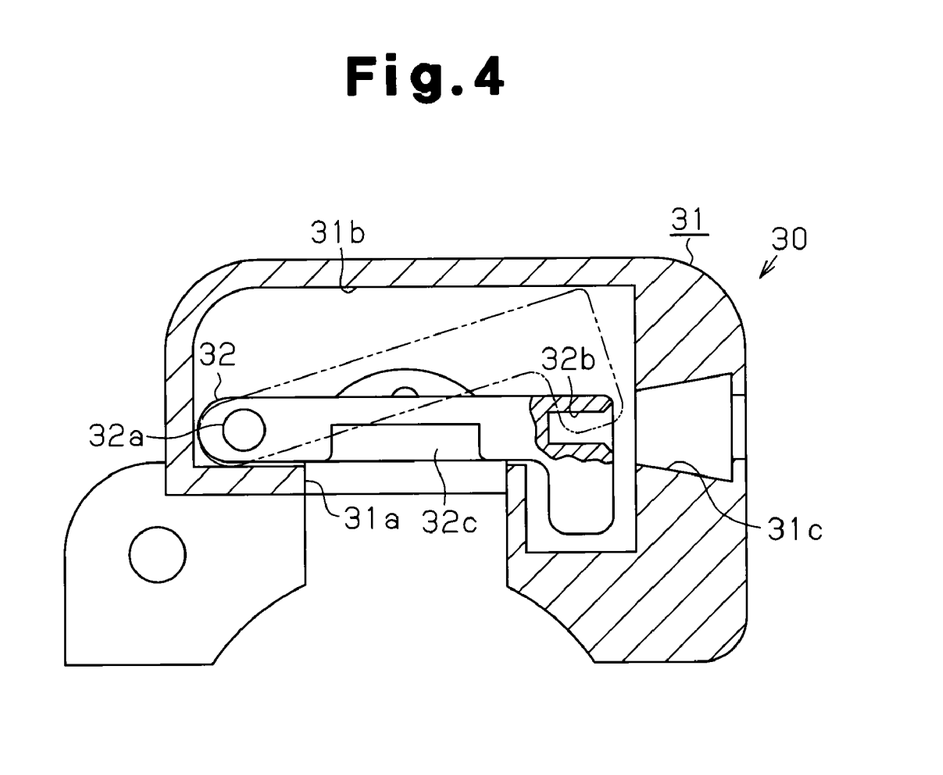
FIG. 4 is a cross-sectional view taken along line B-B in FIG. 3B.

As shown in FIGS. 3A and 3B, the plug lock mechanism 30 is arranged at the upper part of the inlet body 5a. As shown in FIG. 4, the plug lock mechanism 30 includes a case 31, which is fixed to the upper part of the inlet body 5a, and a lock bar 32, which serves as a first restriction member accommodated in the case 31. The case 31 includes a tunnel-like opening 31a extending above the catch 18. The opening 31a allows the hook 16 to be tilted, that is, moved to the second position. The case 31 includes a lock bar compartment 31b, which is in communication with the opening 31a, and a holder compartment 31c, which is in communication with the lock bar compartment 31b. The lock bar compartment 31b is arranged above the opening 31a. The holder compartment 31c is arranged beside (right side as viewed in FIG. 4) of the lock bar compartment 31b. The lock bar 32 is accommodated in the lock bar compartment 31b.

As shown in FIG. 4, the lock bar 32 includes a first end, in which a shaft 32a is arranged, and an opposite second end. The shaft 32a of the lock bar 32 is supported by a bearing 31d (see FIG. 3B) formed in the case 31. The lock bar 32 pivots about the shaft 32a and moves between a lock position (first lock position), which is indicated by solid lines in FIG. 4, and an unlock position (first unlock position), which is indicated by broken lines in FIG. 4. The lock bar 32 includes a central part that is exposed when at the opening 31a in the lock position. The lock bar 32 moves to the unlock position when pivoted upward from the lock position.

Figure 6:
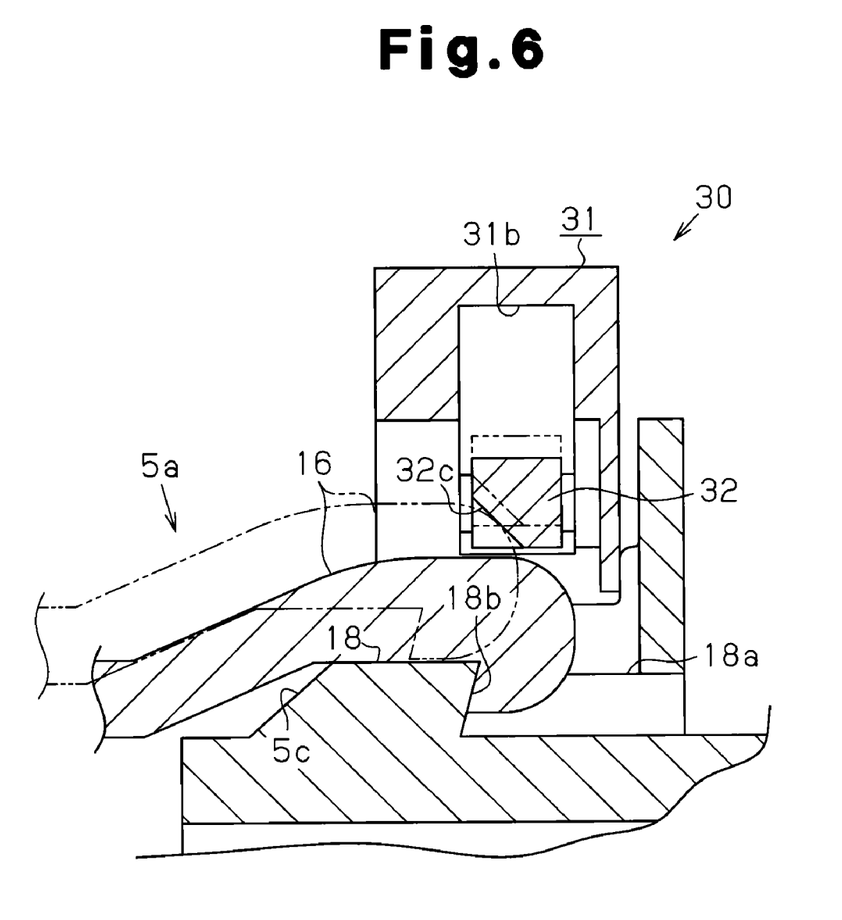
FIG. 6 is a transverse cross-sectional view of the plug lock mechanism showing movement of the lock bar that cooperates with movement of the hook in the power feeding plug.

As shown in FIG. 6, the lock bar 32 is box-shaped. The lock bar 32 includes an inclined surface 32c formed by chamfering the central part of the lock bar 32. The inclined surface 32c is gradually inclined downward in the insertion direction of the power feeding plug 10. Accordingly, when the power feeding plug 10 is inserted to the inlet 5, the inclined surface 32c is pushed by the hook 16, which is tilted upward by the inclined surface 5c as described above. This moves the lock bar 32 to the unlock position. In this manner, the inclined surface 32c converts the pushing force received from the distal end of the hook 16 to force that moves the lock bar 32 upward (see FIG. 6). Accordingly, the pushing force applied by the hook 16 moves the lock bar 32 from the lock position to the unlock position. When the hook 16 stops applying the pushing force, the lock bar 32 falls from the unlock position to the lock position.

As shown in FIG. 4, a lock recess 32b is formed in the end of the lock bar 32 opposite to the shaft 32a, namely, the second end of the lock bar 32. The lock recess 32b extends in the longitudinal direction of the lock bar 32. The lock recess 32b faces the holder compartment 31c when the lock bar 32 is located at the lock position.

Figure 7:
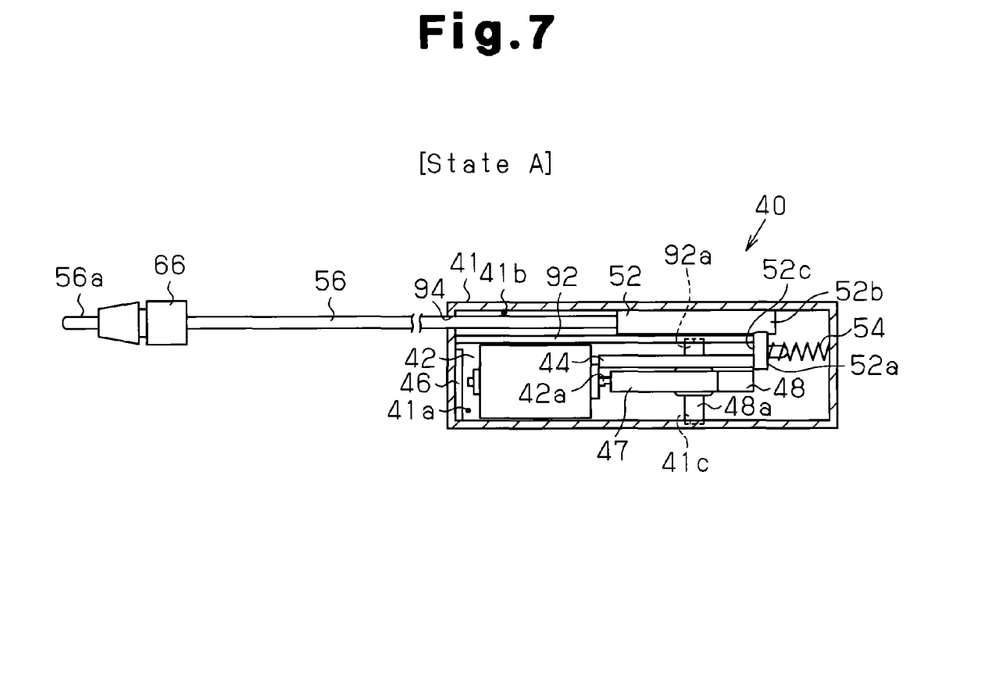
FIG. 7 is a front view showing an actuator mechanism when the lock bar is locked.

The actuator mechanism 40 is fixed inside the body of the vehicle 1. As shown in FIG. 7A, the actuator mechanism 40 includes a case 41 fixed to the vehicle body, a motor 42 serving as a drive source, and a cam 44. The motor 42 and the cam 44 are accommodated in the case 41. A partition plate 92 partitions the interior of the case 41 into an upper first accommodating portion 41a and a lower second accommodating portion 41b, which are in communication with each in the right side of the case 41. A substrate 46, which is electrically connected to the charging ECU 75 (see FIG. 1), is fixed to an inner wall (left wall) of the first accommodating portion 41a. A cable (not shown) electrically connects the motor 42 to the substrate 46 in the first accommodating portion 41a. In this manner, the charging ECU 75, which is connected to the motor 42 by the substrate 46, controls and drives the motor 42. The motor 42 is fixed between an inner wall (lower wall) of the case 41 and the partition plate 92. A motor shaft 42a projects toward the right from the motor 42. A worm gear 47, which rotates coaxially with the motor shaft 42a, is fixed to the motor shaft 42a. A worm wheel 48 is engaged with the worm gear 47. The worm wheel 48 is fixed to a shaft 48a, which extends in the vertical direction. The shaft 48a is supported by a bearing 41c, which is formed in the inner wall of the case 41, and a bearing 92a formed in the partition plate 92. Thus, when the motor shaft 42a rotates, the worm gear 47 rotates the worm wheel 48.

The cam 44, which is disk-shaped, is fixed to the shaft 48a above and parallel to the worm wheel 48. Thus, the worm wheel 48 and the cam 44 rotate integrally with each other.

Figure 8:
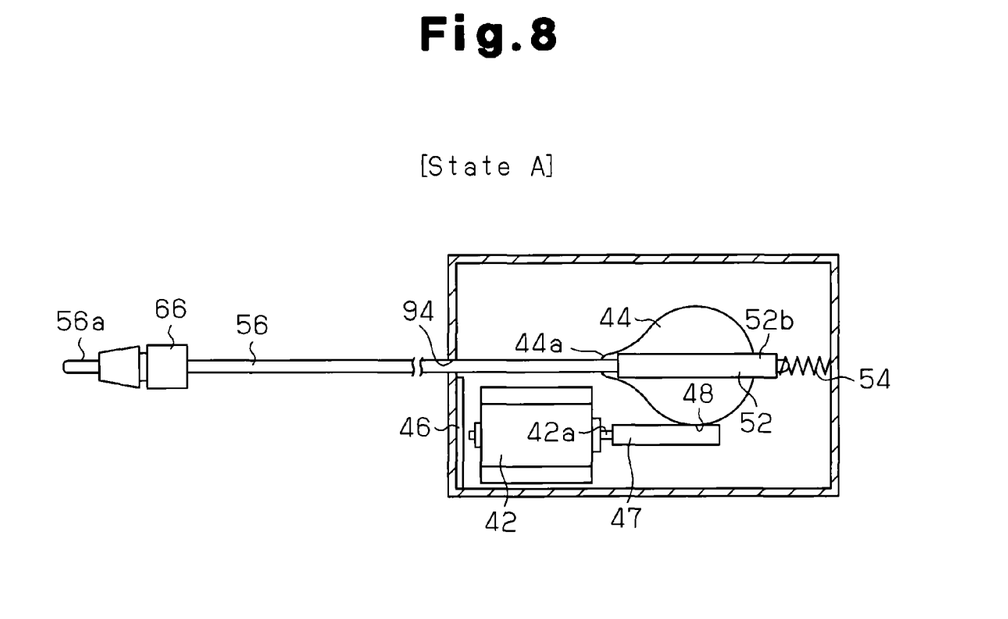
FIG. 8 is a plan view, partially in cross-section, showing the actuator mechanism of FIG. 7.

As shown in FIG. 8, the cam 44 includes a peripheral surface. A cam lobe 44a smoothly projects from the peripheral surface of the cam 44 in the radial direction. More specifically, the peripheral surface of the cam 44 includes a first peripheral surface (cam lobe 44a), which sets an outer path, and a second peripheral surface (peripheral surface excluding the cam lobe 44), which sets an inner path.

As shown in FIG. 7, the second accommodating portion 41b includes a wire assembly 52, which serves as an engagement member. The wire assembly 52 includes a plate-shaped engagement piece 52a, which is arranged at the right side of the cam 44, and a cylindrical sleeve 52b, which is fixed to an edge of the engagement piece 52a and accommodated in the second accommodating portion 41b. In other words, the engagement piece 52a and the cylindrical sleeve 52b are coupled to each other in an L-shaped manner. A coil spring 54, which serves as a biasing member, is arranged between the engagement piece 52a and the right inner wall of the case 41. Accordingly, the wire assembly 52 is biased toward the left by the elastic force of the coil spring 54. The engagement piece 52a is located at the right side of the partition plate 92. Thus, the wire assembly 52 is movable between the edge of the partition plate 92 and the right inner wall of the case 41. The engagement piece 52a includes a contact surface 52c facing the edge of the partition plate 92. When the contact surface 52c of the engagement piece 52a comes into contact with the edge of the partition plate 92, leftward movement of the wire assembly 52 is restricted. When the cam 44 rotates, the cam lobe 44a pushes the contact surface 52c toward the right. This moves the wire assembly 52 toward the right side against the elastic force of the coil spring 54. In the present embodiment, the cam 44 and the wire assembly 52 form a transmission member.

A wire 56, which serves as a second restriction member, is fixed to the cylindrical sleeve 52b. The wire 56 includes a first end, which is inserted into the cylindrical sleeve 52b, and an opposite second end 56a. The second end 56a extends out of the case 41 through a hole 94 formed in the left wall of the second accommodating portion 41b.

Figure 5A:
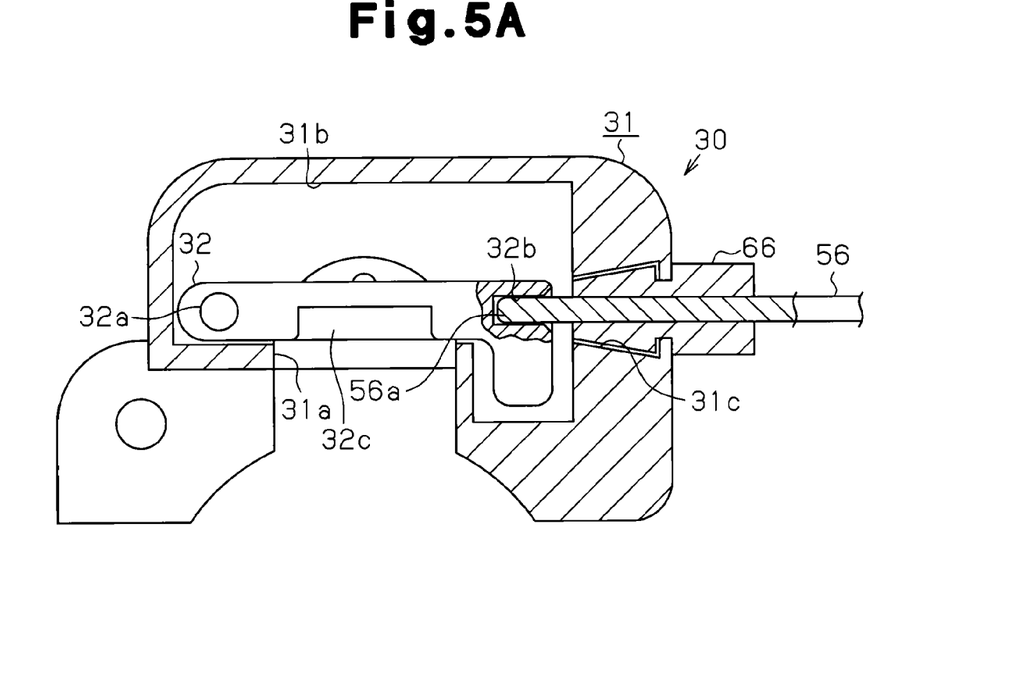
FIG. 5A is a cross-sectional view showing a plug lock mechanism of FIG. 3A when the lock bar is locked.
Figure 5B:
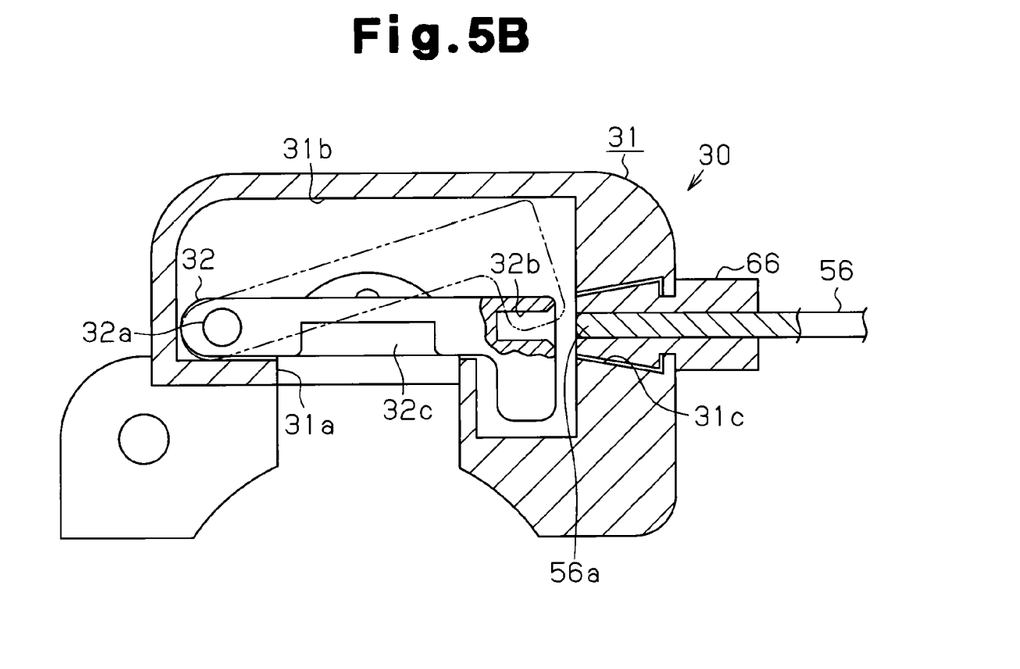
FIG. 5B is a cross-sectional view showing the plug lock mechanism of FIG. 3A when the lock bar is unlocked.
Figure 9:
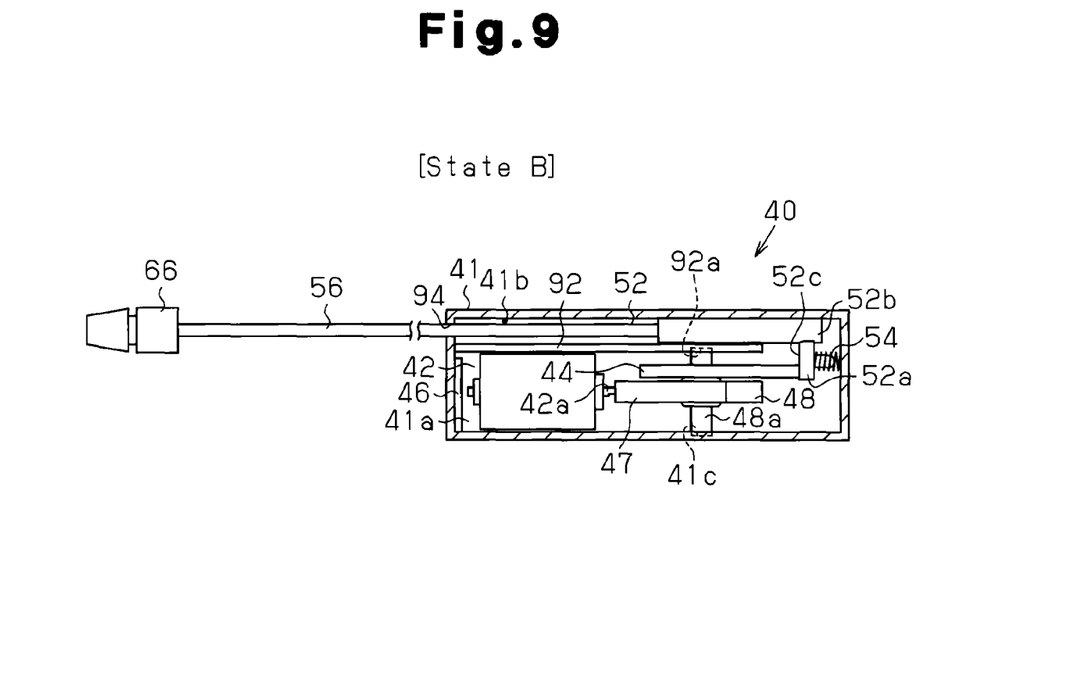
FIG. 9 is a front view of the actuator mechanism when the lock bar is unlocked.
Figure 10:
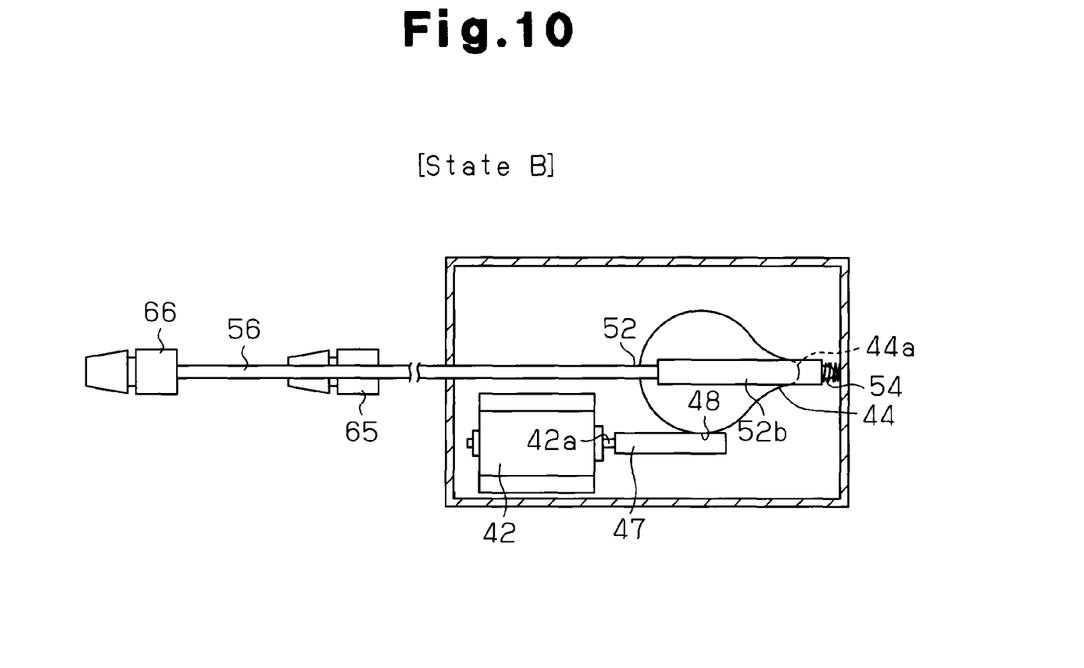
FIG. 10 is a plan view showing the actuator mechanism of FIG. 9.

The second end 56a of the wire 56 is inserted into a tubular wire holder 66 in a movable manner. The second end 56a is projectable from a distal end of the wire holder 66. As shown in FIGS. 5A and 5B, the wire holder 66 is fixed to the holder compartment 31c. As shown in FIGS. 9 and 10, the wire 56 is pulled into the case 41 when the wire assembly 52 moves rightward against the elastic force of the coil spring 54. In this case, the second end 56a of the wire 56 is accommodated in the wire holder 66. As shown in FIGS. 7 and 8, on the other hand, the wire 56 is pushed out of the case 41 when the elastic force of the coil spring 54 moves the wire assembly 52 leftward. In this case, the second end 56a of the wire 56 projects out of the distal end of the wire holder 66. In other words, the wire 56 is moved between a second lock position, at which the second end 56a is projected out of the distal end of the wire holder 66, and a second unlock position, at which the second end 56a is accommodated in the wire holder 66.

Referring to FIG. 5A, the second end 56a of the wire 56 projects into the lock bar compartment 31b when projected out of the wire holder 66. In this case, when the lock bar 32 is positioned at the lock position, the second end 56a is inserted into the lock recess 32b. In this state, the second end 56a is in contact with the inner wall of the lock recess 32b. This restricts movement of the lock bar 32 to the unlock position. Accordingly, in a state in the lock bar 32 is located at the lock position (first lock position), movement of the wire 56 to the second lock position, at which the second end 56a is projected out of the wire holder 66, holds the lock bar 32 at the first lock position.

Referring to FIG. 5B, the second end 56a does not interfere with the lock recess 32b as long as the second end 56a of the wire 56 is accommodated in the lock bar compartment 31b. Accordingly, movement of the wire 56 to the second unlock position, at which the second end 56a is accommodated in the wire holder 66, permits movement of the lock bar 32 from the first lock position to the first unlock position. This permits the lock bar 32 to perform an unlocking operation. The second end 56a of the wire 56 is an example of a projection that engages with the lock recess 32b.

When the unlock operation of the lock bar 32 is permitted (refer to FIG. 5B), the power feeding plug 10 (refer to FIG. 2) can be inserted into the inlet 5. When the power feeding plug 10 is inserted, the hook 16 is guided by the inclined surface 5c to the upper surface of the catch 18, as shown in FIG. 6. The distal end of the hook 16 pushes the inclined surface 32c of the lock bar 32, as shown by the broken lines in FIG. 6. The inclined surface 32c receives an upward pushing force from the hook 16. This moves the lock bar 32 from the lock position, which is indicated by the solid lines in FIG. 6, to the unlock position, which is indicated by the broken lines in FIG. 6. As a result, further insertion of the power feeding plug 10 is permitted until the hook 16 reaches the engagement recess 18a, which is indicated by solid lines in FIG. 6. When reaching the engagement recess 18a, the pushing force of the hook 16 is eliminated, and the lock bar 32 falls to the lock position, as indicated by the solid lines in FIG. 6. The lower surface of the lock bar 32 is located above the hook 16.

In a state in which the hook 16 is engaged with the engagement recess 18a (see FIG. 6), insertion of the wire 56 (second end 56a) into the lock recess 32b of the lock bar 32 as shown in the state of FIG. 5A restricts movement of the lock bar 32 to the unlock position. This holds the lock bar 32 at the lock position. In this state, when the operation portion 17 (see FIG. 2) is operated to tilt the hook 16 upward, movement of the hook 16 is restricted by contact of the upper surface of the hook 16 with the lower surface of the lock bar 32. Since the hook 16 cannot be disengaged from the catch 18, the power feeding plug 10 cannot be disconnected from the inlet 5. This keeps the power feeding plug 10 locked to the inlet 5.

As long as the wire 56 is not inserted into the lock recess 32b, the lock bar 32 is permitted to perform the unlock operation. This allows for the operation of the operation portion 17 to tilt the hook 16. When the hook 16 is tilted upward, the hook 16 pushes the lower surface of the lock bar 32 upward and moves the lock bar 32 to the unlock position. This disengages the hook 16 from the catch 18 and permits removal of the power feeding plug 10 from the inlet 5.

When the wire 56 is inserted in the lock recess 32b before the power feeding plug 10 is connected to the inlet 5, movement of the lock bar 32 from the lock position to the unlock position is restricted. Thus, the lock bar 32 will not move to the unlock position even when the distal end of the hook 16 pushes the inclined surface 32c. This prohibits connection of the power feeding plug 10 to the inlet 5.

The lock and unlock operation of the plug lock mechanism 30 when the actuator mechanism 40 is actuated will now be described.

First, a state A shown in FIG. 7 will be described. In FIG. 8, the cam lobe 44a is located at a nine o'clock position. Thus, the second end 56a of the wire 56 is projected out of the distal end of the wire holder 66 (second lock position). Here, the power feeding plug 10 is not inserted into the inlet 5.

In state A, when the motor 42 produces forward rotation, the motor shaft 42a rotates the worm gear 47 in the forward direction. This rotates the worm wheel 48, which is engaged with the worm gear 47, in the clockwise direction. Accordingly, the cam 44, which is attached to the shaft 48a of the worm wheel 48, rotates in the clockwise direction.

When the worm wheel 48 makes a one half rotation) (180°) from state A, the wire 56 is moved to the state B shown in FIG. 9. This arranges the cam lobe 44a at a three o'clock position, as shown in FIG. 10. Accordingly, when the cam lobe 44a pushes the contact surface 52c rightward, the wire assembly 52 is moved rightward against the elastic force of the coil spring 54. This arranges the second end 56a of the wire 56 in the wire holder 66 (second unlock position). Thus, the second end 56a is separated from the lock recess 32b thereby allowing for the lock bar 32 to perform the unlock operation.

When the motor 42 is further forward rotated and the worm wheel 48 makes a one and a half rotation from state B (one rotation from state A, that is, 360°), the wire 56 is again moved to the state A shown in FIG. 7. In this case, the cam lobe 44a is separated from the contact surface 52c of the wire assembly 52 and positioned in the direction of nine o'clock, as shown in FIG. 8. The wire assembly 52 is thus moved towards the left side until the contact surface 52c is brought into contact with the edge of the partition plate 92 by the elastic force of the coil spring 54. The second end 56a of the wire 56 is then projected out from the wire holder 66 (second lock position). The second end 56a is thus inserted to the lock recess 32b, and the lock bar 32 is held at the lock position.

Figure 11:
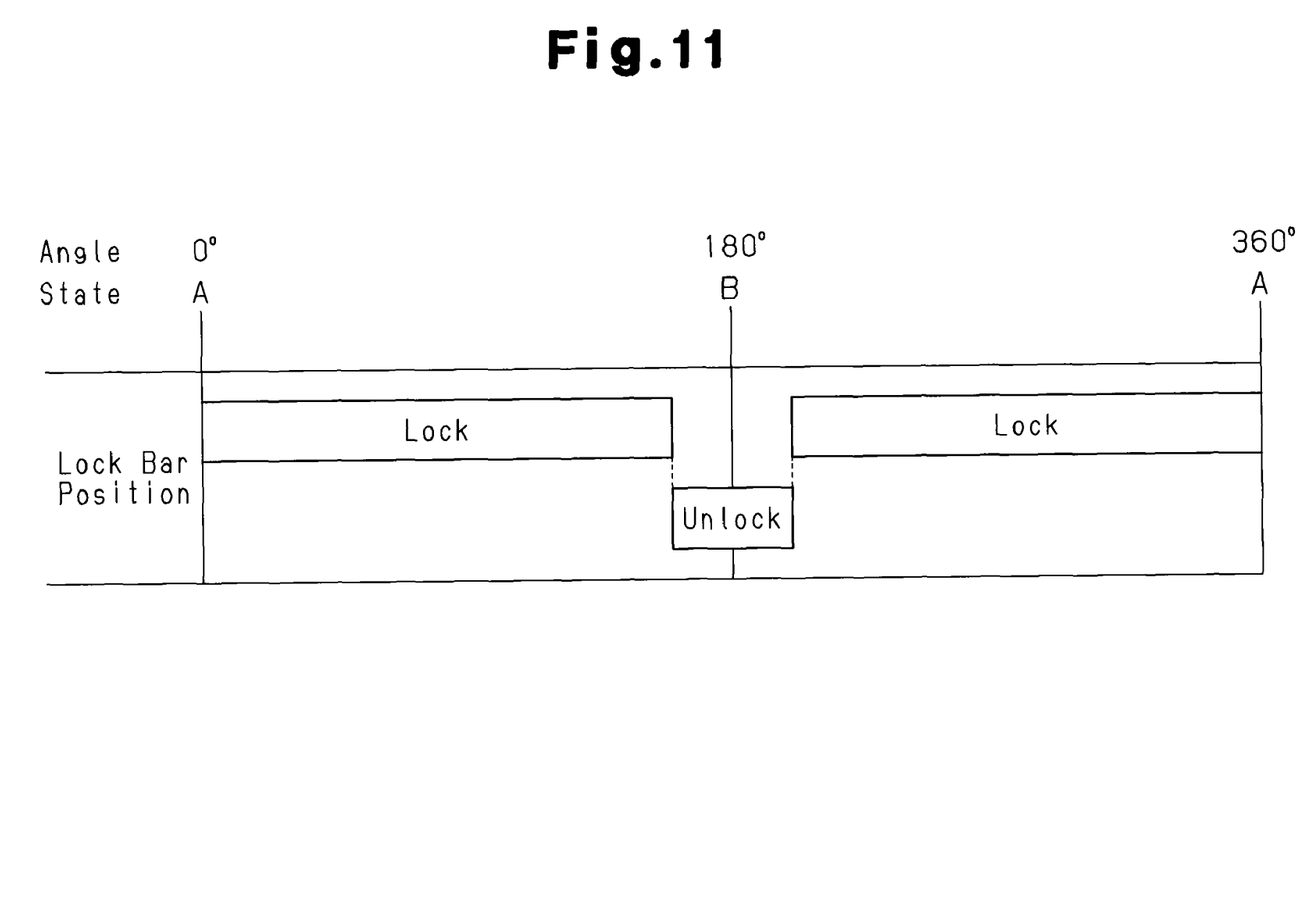
FIG. 11 is a chart showing the transition between the lock position and the unlock position of the lock bar driven by the actuator mechanism.

The operation of the actuator mechanism 40 when connecting the power feeding plug 10 to the inlet 5 and charging the battery 4 with the external power supply 61 will now be described with reference to the time chart shown in FIG. 11. First, the description will start from state A, which is a normal state (non-charging state).

When recognizing that the removal switch 76 is operated with the ID authentication accomplished, the charging ECU 75 forward rotates the motor 42 to shift the actuator mechanism 40 from state A to state B. In this case, the lock bar 32 can be moved between the first lock position and the first unlock position. In other words, the movement of the lock bar 32 is permitted. Therefore, the user can insert the power feeding plug 10 to the inlet 5.

When the power feeding plug 10 is inserted into the inlet 5, the charging ECU 75 receives a connection signal from the charging device 62. The charging ECU 75 then starts to charge the battery 4 with the external power supply 61 through the converter 6. Upon recognition of the connection of the power feeding plug 10 and the inlet 5, the charging ECU 75 produces forward rotation with the motor 42 and shifts the actuator mechanism 40 from state B to state A. This inserts the second end 56a of the wire 56 into the lock recess 32b of the lock bar 32. Accordingly, the lock bar 32 cannot be moved from the lock position. In other words, the power feeding plug 10 is locked and cannot be removed from the inlet 5.

After the charging of the battery 4 is completed, when operation of the removal switch 76 is recognized in a state in which ID verification accomplished again, the charging ECU 75 produces forward rotation with the motor 42 to shift the actuator mechanism 40 from state A to state B. This permits the unlock operation of the lock bar 32 and allows the lock bar 32 to move from the lock position to the unlock position. Here, by operating the operation portion 17 and disengaging the hook 16 from the catch 18, the power feeding plug 10 can be removed from the inlet 5 to.

When the power feeding plug 10 is disconnected from the inlet 5, the charging ECU 75 cannot receive the connection signal from the charging device 62. Thus, the charging ECU 75 determines that the power feeding plug 10 has been removed from the inlet 5. The charging ECU 75 then produces forward rotation with the motor 42 to shift the actuator mechanism 40 from state B to state A. This ends the series of operations performed by the actuator mechanism 40 when charging the battery 4 with the external power supply 61.

The locking device 100 of the present embodiment has the advantages described below.

(1) The motor 42 and the inlet 5 are arranged at different positions. The driving force of the motor 42 is transmitted to the wire 56. The wire 56 moves between the second lock position, at which the second end 56a is engaged with the lock bar 32, and the second unlock position, at which the second end 56a is separated from the lock bar 32. Thus, the second end 56a of the wire 56 switches the lock bar 32 between locked and unlocked states. This structure allows for the inlet 5 to be miniaturized since space is not necessary for the motor 42 as compared to when the motor 42 is arranged in the inlet 5. As a result, there is more freedom for selecting the location at which the inlet 5 is installed in, for example, the vehicle 1.

(2) The rotation of the motor 42 is converted into a reciprocating motion of the wire 56 between the second lock position and the second unlock position by using the cam 44, which pushes the wire assembly 52 back and forth. As a result, the wire 56 is inserted into and removed from the lock recess 32b. In this manner, the rotational motion produced by the motor 42 is converted into the reciprocating motion of the wire 56 with a simple structure, namely the cam 44.

(3) The motor 42 moves the wire 56 to switch the lock bar 32 between locked and unlocked states. The wire 56 can be laid out with a high degree of freedom. This increases the degree of freedom in the positional relationship of the plug lock mechanism 30 (inlet 5) and the actuator mechanism 40.

(4) When the cam lobe 44a is in contact with the engagement piece 52a, the second end 56a of the wire 56 is held at the second unlock position. When the cam lobe 44a faces away from the engagement piece 52a, the second end 56a is held at the second lock position. Thus, as the motor 42 produces rotation in the same direction, the second end 56a moves between the second lock position and the second unlock position. Since the motor 42 does not have to produce reverse rotation to restrict and permit movement of the lock bar 32, the control for operating the lock bar 32 is simplified.

It should be apparent to those skilled in the art that the present invention may be embodied in many other specific forms without departing from the spirit or scope of the invention. Particularly, it should be understood that the present invention may be embodied in the following forms.

In the embodiment described above, a plurality of cams 44 may be used. In such a case, the wire 56 can be moved between the second lock position and the second unlock position by a small amount of rotation produced by the motor 42.

In the embodiment described above, the worm gear 47 and the worm wheel 48 may be eliminated. In other words, the motor shaft 42a may be directly engaged with the cam 44. In addition to the advantages of the embodiment described above, there is no mechanical load that would be produced between the worm gear 47 and the worm wheel 48. This reduces the load applied to the motor 42.

In the embodiment described above, the cam 44 and worm wheel 48 may be formed integrally with each other.

In the embodiment described above, the wire 56 may be inserted into a tube in a movable manner. For example, the case 41 and the wire holder 66 may be coupled to the tube, and the wire 56 may be inserted through the tube. In such a case, the wire 56 does not directly contact any component of the vehicle 1. Accordingly, even when the tube is laid out in a complex manner between components of the vehicle 1, the wire 56 can smoothly move through the tube between the second lock position and the second unlock position. This increases the degree of freedom for the positional relationship of the plug lock mechanism 30 and the actuator mechanism 40.

In the embodiment described above, a rod may be used as the second restriction member in lieu of or in addition to the wire 56. When used with the wire 56, the rod may be coupled to the wire 56. In this case, the movement of the wire assembly 52 moves the rod. A recess may be formed in the rod. In this case, the lock bar 32 may include a lock projection inserted into the recess of the rod. In such a structure, the movement of the rod engages the recess and the projection and switches the lock bar 32 between locked and unlocked states.

In the embodiment described above, the cam 44 does not necessarily have to be shaped to include the cam lobe 44a (projection). For example, the cam 44 may be elliptical shape. Alternatively, the cam 44 may be a circular eccentric cam, the center of rotation of which is deviated from the center of the cam. Any kind of cam that sets two paths, an inner path and an outer path, may be used.

In the embodiment described above, if the removal switch 76 is operated when the battery 4 is being charged with the external power supply 61, the charging ECU 75 may suspend the charging and drive the motor 42 to unlock the lock bar 32.

In the embodiment described above, the motor 42 may be driven to produce reverse rotation. Further, forward rotation and reverse rotation produced by the motor 42 may be used in combination.

In the embodiment described above, the inlet 5 is arranged in the right front wall of the vehicle 1 but is not limited to such a location. The inlet 5 may be arranged anywhere, such as the rear side or front side surface of the vehicle.

In the embodiment described above, the hook 16 is arranged above the coupler 14 of the power feeding plug 10.

Instead, a plurality of hooks 16 may be arranged at locations such as above and below the coupler 14 so as to sandwich the coupler 14.

In the embodiment described above, the hook 16 may be arranged in the inlet 5 and the catch 18 may be arranged in the power feeding plug 10.

In the embodiment described above, the drive source is not limited to the motor 42 and other driving devices may be used instead, such as a rotary solenoid.

In the embodiment described above, the inlet lid 5d may be eliminated.

In the embodiment described above, the verification of the vehicle key is not limited to the ID verification performed on the electronic key 80 and may be a mechanical verification performed on a mechanical key.

In the embodiment described above, the electronic key system 70 may adopt an immobilizer system that uses a transponder to transmit the ID code.

In the embodiment described above, the frequency of the radio wave used in the electronic key system 70 is not limited to LF or UHF and other frequencies may be used. The frequency when transmitting radio wave from the vehicle 1 to the electronic key 80 and the frequency when returning the radio wave from the electronic key 80 to the vehicle 1 do not have to be different frequencies and may be the same frequency.

In the embodiment described above, the user verification is not necessarily limited to the key verification performed on the electronic key 80 and may be another type of verification, such as biometric verification.

In the embodiment described above, the locking device 100 is applied to the inlet 5 of the plug-in type hybrid vehicle 1. Instead, the locking device 100 may be applied to the inlet of an electric vehicle.

In the embodiment described above, the application of the locking device 100 is not limited to the vehicle 1.

The locking device 100 may be applied to any device or equipment including having a rechargeable battery, such as an electrical motorcycle.

The present examples and embodiments are to be considered as illustrative and not restrictive, and the invention is not to be limited to the details given herein, but may be modified within the scope and equivalence of the appended claims.

The invention claimed is:

1. A locking device that locks a power feeding plug to a power receiving connector, one of the power feeding plug and the power receiving connector including a hook, the other one of the power feeding plug and the power receiving connector including a catch, the locking device comprising:
   a first restriction member moved between a first lock position, at which the first restriction member holds the hook on the catch, and a first unlock position, at which the first restriction member permits the hook to move away from the catch, wherein when the hook moves away from the catch, the first restriction member is moved to the first unlock position in cooperation with the hook;
   a second restriction member moved between a second lock position, at which the second restriction member is engaged with the first restriction member and restricts movement of the first restriction member from the first lock position to the first unlock position, and a second unlock position, at which the second restriction member is disengaged from the first restriction member and permits movement of the first restriction member to the first unlock position;

a drive source arranged at a position separated from the power receiving connector, wherein the drive source generates driving force that moves the second restriction member; and a transmission member that transmits the driving force of the drive source to the second restriction member.

2. The locking device according to claim 1, wherein
the drive source is a motor;
the transmission member includes:
  a cam driven and rotated by the motor, and
  an engagement member coupled to the second restriction member; and
the engagement member is engaged with and moved by the cam thereby moving the second restriction member from the second lock position to the second unlock position.

3. The locking device according to claim 1, wherein the second restriction member includes a wire.

4. The locking device according to claim 2, further comprising a wire that couples the engagement member to the second restriction member.

5. The locking device according to claim 1, further comprising:
  a recess formed in one of the first restriction member and the second restriction member; and
  a projection formed on the other one of the first restriction member and the second restriction member, wherein the projection is engageable with the recess;
  wherein the projection engages with the recess when the second restriction member is moved from the second unlock position to the second lock position in a state in which the first restriction member is located at the first lock position.

6. The locking device according to claim 1, wherein the transmission member includes an engagement member coupled to the second restriction member, and the locking device further comprises a biasing member that biases the engagement member in a direction in which the second restriction member moves to the second lock position.

7. The locking device according to claim 6, wherein
the transmission member includes a cam driven and rotated by the drive source;
the cam includes a first peripheral surface, which defines an outer path, and a second peripheral surface, which defines an inner path;
when the second peripheral surface of the cam engages with the engagement member, the engagement member receives biasing force from the biasing member and moves the second restriction member to the second lock position; and
when the first peripheral surface of the cam engages with the engagement member, the engagement member pushes the biasing member and moves the second restriction member to the second unlock position.

8. The locking device according to claim 1, further comprising:
  a first case arranged in the power receiving connector, wherein the first case accommodates the first restriction member; and
  a second case separated from the first case, wherein the second case accommodates the drive source and the transmission member;
  wherein the second restriction member is arranged between the first case and the second case.

* * * * *